United States Patent [19]
Nakazawa

[11] Patent Number: 5,563,909
[45] Date of Patent: Oct. 8, 1996

[54] RADIO COMMUNICATION SYSTEM

[75] Inventor: Isao Nakazawa, Kawasaki, Japan

[73] Assignee: Fujitsu Limited, Kanagawa, Japan

[21] Appl. No.: 272,264

[22] Filed: Jul. 8, 1994

[30] Foreign Application Priority Data

Dec. 15, 1993 [JP] Japan ................................ 5-315203

[51] Int. Cl.[6] ............................................. H04B 7/10
[52] U.S. Cl. ........................ 375/224; 342/196; 375/347
[58] Field of Search ................................. 375/224, 346, 375/347; 342/192, 196; 455/132, 137, 272

[56] References Cited

U.S. PATENT DOCUMENTS

| | | | |
|---|---|---|---|
| 5,231,648 | 7/1993 | Driedger et al. | 375/231 |
| 5,367,539 | 11/1994 | Copley | 375/347 |
| 5,412,390 | 5/1995 | Peavey et al. | 342/417 |

*Primary Examiner*—Stephen Chin
*Assistant Examiner*—Kevin Kim

[57] ABSTRACT

A radio communication system for mobile communications, or more specifically, a radio receiver for a base station which receives signals transmitted from a plurality of mobile stations is provided wherein the propagation characteristics of channels with respect to a frequency domain can be instanteously measured at all times even while the channels are in use. A frequency converter collectively receives signals transmitted from the mobile stations and converts the signals to IF-band signals, respectively. The IF-band signals output from the frequency converter are set apart from one another by corresponding ones of frequency differences of the signals transmitted from the mobile stations. Complex Fourier transform deriving means collectively derives the complex Fourier transforms of these IF-band signals, and outputs the resulting frequency spectra to analyzing means. The analyzing means simultaneously analyzes the propagation characteristics of the individual received waves, based on the frequency spectra supplied thereto. In accordance with the results of the analysis, a wave having excellent propagation characteristics is received.

16 Claims, 14 Drawing Sheets

RADIO COMMUNICATION SYSTEM

BACKGROUND OF THE INVENTION

(1) Field of the Invention

The present invention relates to a radio communication system, and more particularly, to a radio receiver for a base station which receives signals transmitted from a plurality of mobile stations in mobile communications.

In the present invention, characteristics of propagation channels, such as transmission quality which can be lowered by multipath fading or the like, can be collectively measured while the channels are in use, and the propagation characteristics of received waves containing a burst receive signal are simultaneously measured and analyzed so that a received wave having excellent propagation characteristics may be selected based on the result of the analysis.

(2) Description of the Related Art

Recent increase in data transmission speed requires that not only fluctuation of received power but the influence of multipath fading be given consideration in the field of mobile communications.

Among conventional methods for measuring the influence of multipath fading, a typical example is a method wherein the delay time of multiplex propagation is measured. Namely, a delay profile is measured based on the amount of delay of multiplex wave propagation and the received power.

Also, error rate such as parity is measured in order to monitor the communication system during operation.

The method of measuring the delay time of multiplex propagation, however, requires a special modulated signal for the measurement and is unable to be implemented during operation. Further, the measurement consumes much time.

As for the measurement of error rate such as parity, the measurement time is long and there occurs a delay in the determination of the transmission quality.

SUMMARY OF THE INVENTION

An object of the present invention is to provide a radio communication system capable of instantly measuring the propagation characteristics of channels at any time while the channels are in use.

Another object of the present invention is to provide a radio communication system which ensures excellent transmission quality in mobile communications even when the propagation state is unstable.

To achieve the above objects, the present invention provides a radio receiver for a base station which receives signals transmitted from a plurality of mobile stations. The radio receiver comprises a frequency converter for collectively receiving signals transmitted from the mobile stations and converting the signals to IF-band signals, respectively, complex Fourier transform deriving means for collectively deriving complex Fourier transforms of the converted IF-band signals, and analyzing means for simultaneously analyzing propagation characteristics of individual received waves, based on output data from the complex Fourier transform deriving means, and outputting results of the analysis.

The present invention also provides a radio communication system having a base station. The radio communication system comprises a plurality of mobile stations for respectively transmitting signals, a frequency converter arranged at the base station, for collectively receiving the signals transmitted from the mobile stations and converting the signals to IF-band signals, respectively, complex Fourier transform deriving means arranged at the base station, for collectively deriving complex Fourier transforms of the converted IF-band signals, and analyzing means arranged at the base station, for simultaneously analyzing propagation characteristics of individual received waves, based on output data from the complex Fourier transform deriving means, and outputting results of the analysis.

Further, the present invention provides a radio receiver for a base station which receives signals transmitted from a plurality of mobile stations. The radio receiver comprises a plurality of receiving antennas; a plurality of frequency converters connected to the receiving antennas, respectively, for collectively receiving signals transmitted from the mobile stations, the frequency converters having local oscillators respectively built therein and having different oscillation frequencies for converting the received signals to IF-band signals, respectively; synthesizing means for synthesizing the individual IF-band signals output from the frequency converters; complex Fourier transform deriving means for collectively deriving complex Fourier transforms of the IF-band signals synthesized by the synthesizing means; and analyzing means for simultaneously analyzing propagation characteristics of individual received waves, based on output data from the complex Fourier transform deriving means.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

The principles of the present invention will be first explained with reference to FIGS. 1 and 2.

Figure 1:
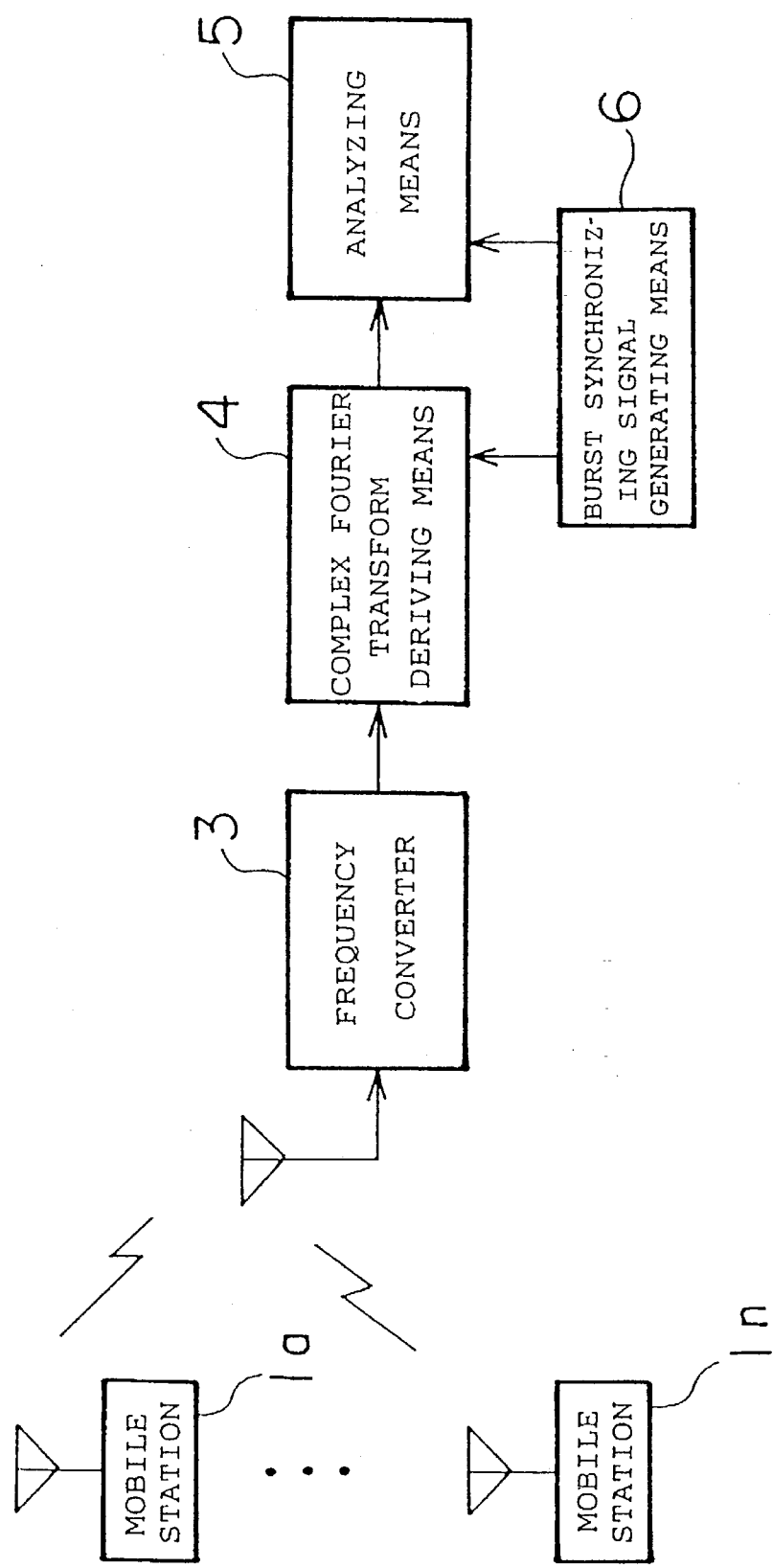
FIG. 1 is a diagram illustrating a first principle of the present invention.

As shown in FIG. 1, the present invention provides a radio receiver which is characterized by comprising a frequency converter 3 for collectively receiving a plurality of signals transmitted from a plurality of mobile stations 1a–1n and for converting the received signals to IF-band signals, respectively, complex Fourier transform deriving means 4 for collectively deriving the complex Fourier transforms of the individual IF-band signals, and analyzing means 5 for simultaneously analyzing the propagation characteristics of individual received waves, on the basis of the output data from the complex Fourier transform deriving means 4 and outputting the results of the analyses.

Figure 2:
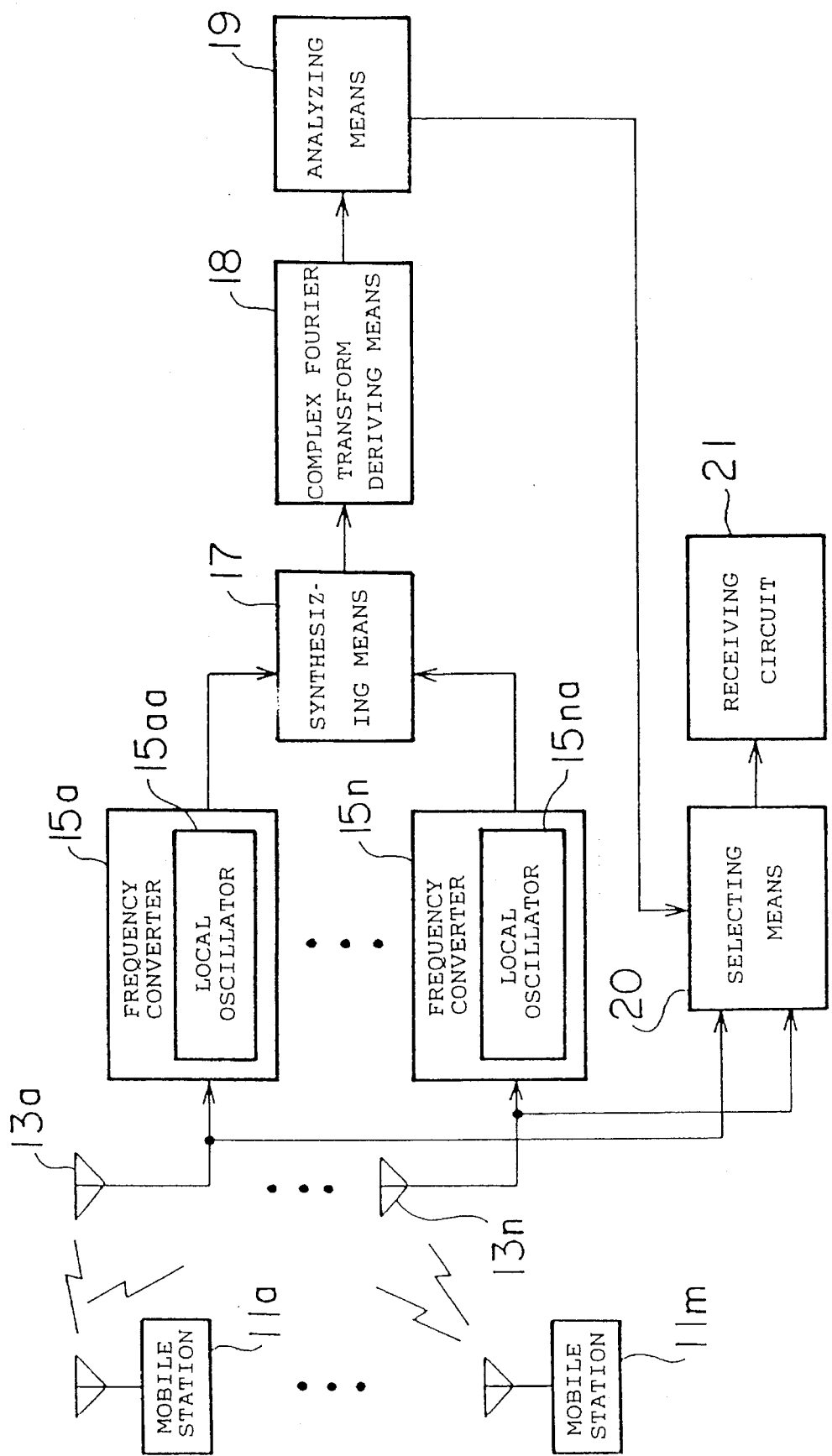
FIG. 2 is a diagram illustrating a second principle of the present invention.

The present invention also provides a radio receiver which is characterized by comprising, as shown in FIG. 2, a plurality of receiving antennas 13a–13n a plurality of frequency converters 15a–15n connected to the respective receiving antennas 13a–13n, for collectively receiving signals transmitted from a plurality of mobile stations 11a–11m and for converting the received signals to IF-band signals, respectively, by means of built-in local oscillators 15a–15n having respective different oscillation frequencies, synthesizing means 17 for synthesizing the individual IF-band signals output from the frequency converters 15a–15n, complex Fourier transform deriving means 18 for collectively deriving the complex Fourier transforms of the IF-band signals synthesized by the synthesizing means 17, and analyzing means 19 for simultaneously analyzing the propagation characteristics of individual received waves, on the basis of the output data from the complex Fourier transform deriving means 18.

The second radio receiver further comprises selecting means 20 for comparing each of the propagation characteristics of those received waves which are transmitted from an identical mobile station and received by different antennas, on the basis of the results of the analyses carried out by the analyzing means 19, and for permitting a received wave having excellent propagation characteristics to be supplied from the corresponding antenna to a receiving circuit 21. The above-mentioned identical mobile station is generally selected by means of a frequency therewith, or the mobile station is selected by means of a time slot assigned thereto in TDMA (Time Division Multiple Access).

In the second radio receiver, a plurality of complex Fourier transform deriving means may be disposed in the front of the analyzing means 19 in correspondence with the frequency converter 15a–15n without disposing the synthesizing means 17.

In the radio receiver of FIG. 1 having the above-described configuration, the frequency converter 3 collectively receives signals transmitted from the mobile stations 1a–1n, and converts the received signals to IF-band signals, respectively. The IF-band signals output from the frequency converter 3 are set apart from one another by corresponding ones of frequency differences of the signals transmitted from the mobile stations 1a–1n. The complex Fourier transform deriving means 4 collectively derives the complex Fourier transforms of these IF-band signals and outputs the resulting frequency spectra to the analyzing means 5. Based on the frequency spectra, the analyzing means 5 simultaneously analyzes the propagation characteristics of the individual received waves. Specifically, the analyzing means 5 obtains narrow-band power fluctuation, broad-band power fluctuation, probability density function of an instantaneous value of power fluctuation, broad-band transmission characteristics, notches, etc.

In the radio receiver shown in FIG. 2, the frequency converters 15a–15n are supplied collectively with signals which are transmitted from the mobile stations 11a–!11m and received by the respective receiving antennas, and convert the signals to IF-band signals, respectively. In this case, since the local oscillators 15a–15n built in the respective frequency converters 15a–15n have different oscillation frequencies, the frequency converters 15a–15n output IF-band signals in such a manner that the output signals are set apart from one another by corresponding ones of frequency differences of the signals transmitted from the mobile stations 11a–11m, and also by the differences of the oscillation frequencies of the local oscillators 15aa–15na. These IF-band signals are synthesized by the synthesizing means 17, and the complex Fourier transform deriving means 18 collectively derives the complex Fourier transforms of the synthesized signals, the resulting frequency spectra being supplied to the analyzing means 19. Based on the frequency spectra, the analyzing means 19 simultaneously analyzes the propagation characteristics of the received waves, individually.

On the basis of the results of the analyses, the selecting means 20 compares the propagation characteristics of those received waves which are transmitted from an identical mobile station and received by different receiving antennas, and permits a received wave having excellent propagation characteristics to be supplied from the corresponding receiving antenna to the receiving circuit 21.

Embodiments of the present invention will be now described in detail with reference to the accompanying drawings.

Figure 3:
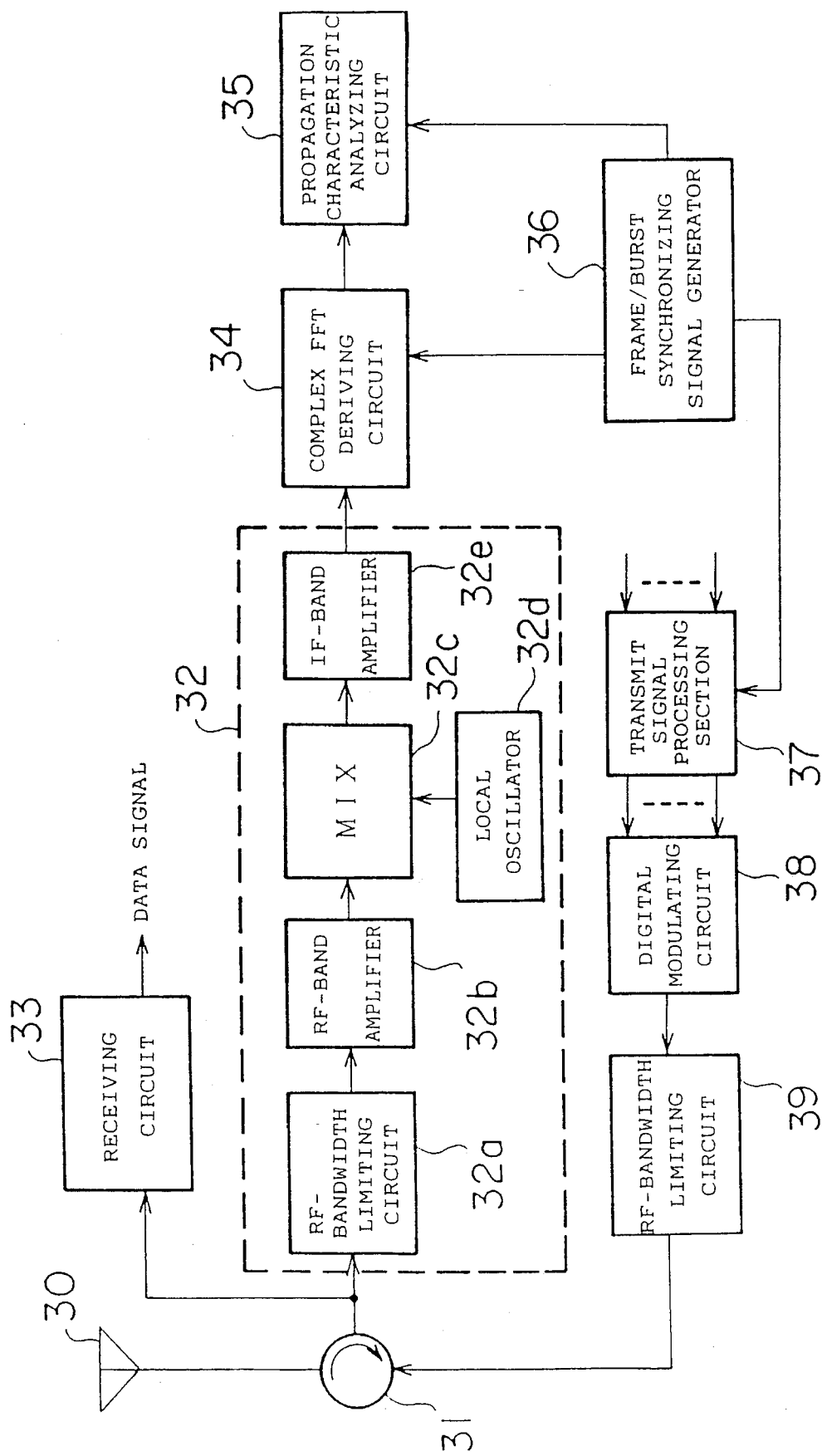
FIG. 3 is a block diagram of a radio receiver according to a first embodiment.

FIG. 3 is a block diagram of a radio receiver according to a first embodiment. This radio receiver is installed in a base station for collectively receiving radio waves transmitted from a plurality of mobile stations (not shown) each having a slightly different transmission frequency.

An antenna 30 receives signals transmitted from the mobile stations, and supplies the received signals to a frequency converter 32 for measuring propagation characteristics and to a receiving circuit 33 for receiving data signals, via a circulator 31. The frequency converter 32 comprises an RF-bandwidth limiting circuit 32a, an RF band amplifier 32b, a mixer (MIX) 32c, a local oscillator 32d, and an IF band amplifier 32e, and converts the signals transmitted from the mobile stations to IF signals, respectively.

Figure 4:
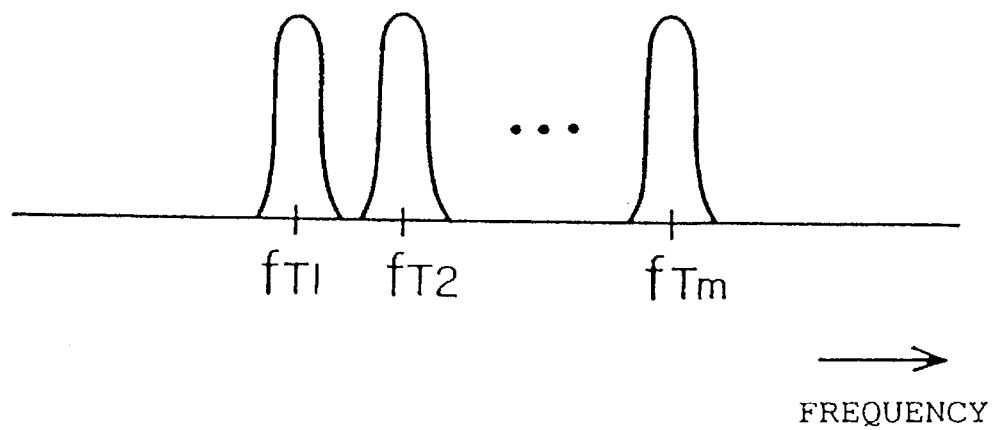
FIG. 4(A) is a diagram showing a frequency spectrum before a frequency conversion.
FIG. 4(B) is a diagram showing a frequency spectrum after the frequency conversion.
Figure 4:
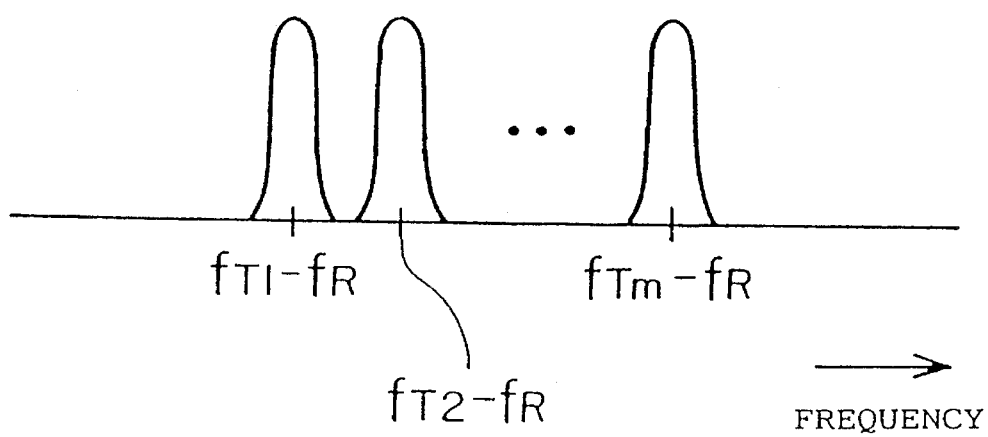

The frequency spectra of FIG. 4 illustrate how the frequency conversion is carried out. Namely, the frequency converter 32 is supplied with signals (transmission frequencies $f_{T1}, f_{T2}, \ldots f_{Tm}$) from a plurality of mobile stations, as shown in FIG. 4(A), then collectively changes the frequencies of the received signals by an amount equal to the oscillation frequency fR of the local oscillator 32d, and outputs IF signals having frequencies $f_{T1}-f_R, f_{T2}-f_R, \ldots f_{Tm}-f_R$, as shown in FIG. 4(B).

Figure 5:
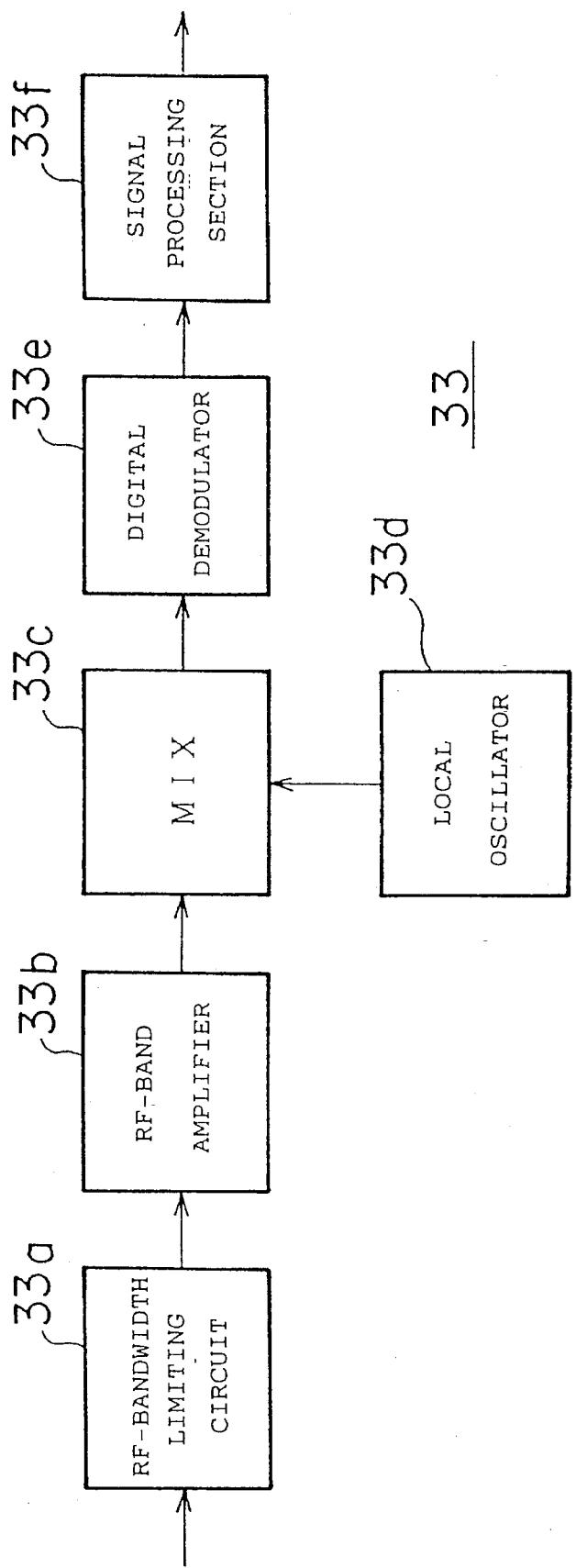
FIG. 5 is a block diagram illustrating the internal arrangement of a receiving circuit.

FIG. 5 is a block diagram showing the internal arrangement of the receiving circuit 33. The receiving circuit 33 comprises an RF-bandwidth limiting circuit 33a, an RF band amplifier 33b, a mixer (MIX) 33c, a local oscillator 33d, a digital demodulator 33e, and a signal processing section 33f. The receiving circuit 33 extracts data signals from the received signals and outputs the extracted signals. Although not shown, the receiving circuit 33 also includes a circuit for separating the received signals from one another.

Referring again to FIG. 3, the IF signals output from the frequency converter 32 are supplied to a complex FFT deriving circuit 34, which then derives fast complex Fourier transforms of the IF signals and outputs the resulting frequency spectra to a propagation characteristic analyzing circuit 35.

The complex FFT deriving circuit 34 and the propagation characteristic analyzing circuit 35 are each supplied with a frame synchronizing signal and a burst synchronizing signal from a frame/burst synchronizing signal generator 36, and carries out signal processing in synchronism with these signals.

Figure 6:
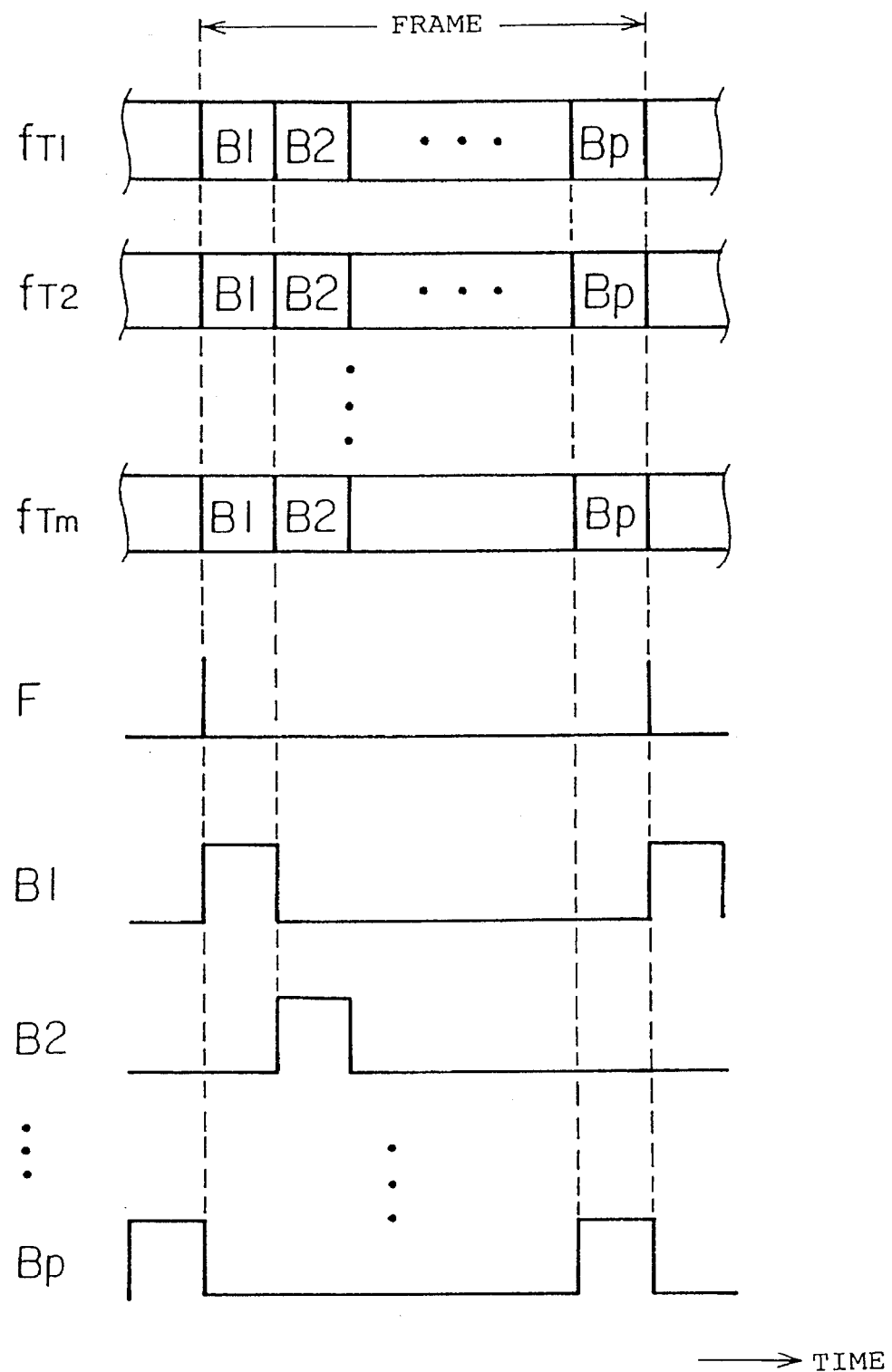
FIG. 6 is a chart illustrating a frame synchronizing signal and burst synchronizing signals.

FIG. 6 illustrates the frame synchronizing signal and the burst synchronizing signal. The transmitted signals with frequencies $f_{T1}, f_{T2}, \ldots f_{Tm}$ each have a frame composed of bursts B1 to Bp. The frame/burst synchronizing signal generator 36 (in FIG. 3) generates a frame synchronizing signal F in synchronism with the start of each frame, and generates burst synchronizing signals B1 to Bp for time periods corresponding to the respective bursts.

In FIG. 3, the complex FFT deriving circuit 34 derives the complex Fourier transforms within an aperture time length shorter than the burst length. For example, provided the time length of one frame is 5 msec and the number of bursts in a frame is 8, the complex Fourier transforms are derived at time intervals shorter than 625 μsec (=5 msec/8) as sample timing.

The propagation characteristic analyzing circuit 35 will be described in detail later.

The frame synchronizing signal and the burst synchronizing signal, generated by the frame/burst synchronizing signal generator 36, are also supplied to a transmit signal processing section 37 of a transmission system. The transmit signal processing section 37 is supplied with a plurality of transmit signals via an external interface (not shown), and subjects the transmit signals to a variety of signal processing. The processed signals are subjected to digital modulation at a digital modulating circuit 38, and then supplied to the antenna 30 via an RF-bandwidth limiting circuit 39 and the circulator 31.

Figure 7:
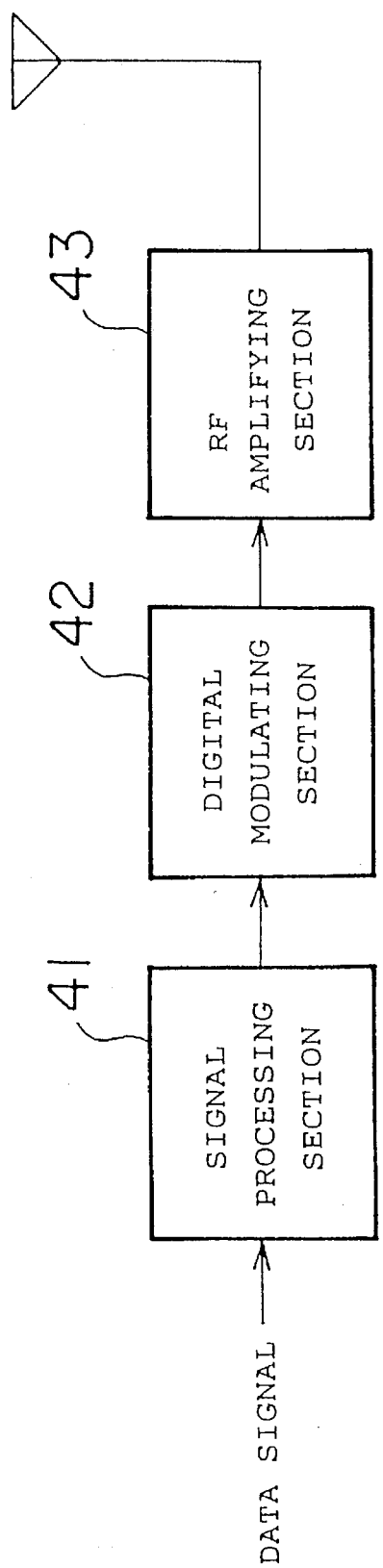
FIG. 7 is a block diagram illustrating the arrangement of a transmitting side of a mobile station.

FIG. 7 is a block diagram showing the arrangement of a transmitting side of the mobile station. As illustrated, the transmitting side comprises a signal processing section 41 for carrying out a variety of signal processing, a digital modulating section 42 for carrying out digital modulation, and an RF amplifying section.

The propagation characteristic analyzing circuit 35 (in FIG. 3) will be now explained.

The propagation characteristic analyzing circuit 35 derives a narrow-band power fluctuation, a broad-band power fluctuation, a probability density function of an instantaneous value of power fluctuation, broad-band transmission characteristics, notches (sudden depressions of electric power within the power spectrum band), etc., on the basis of the frequency power spectrum of each transmitted signal.

Figure 8:
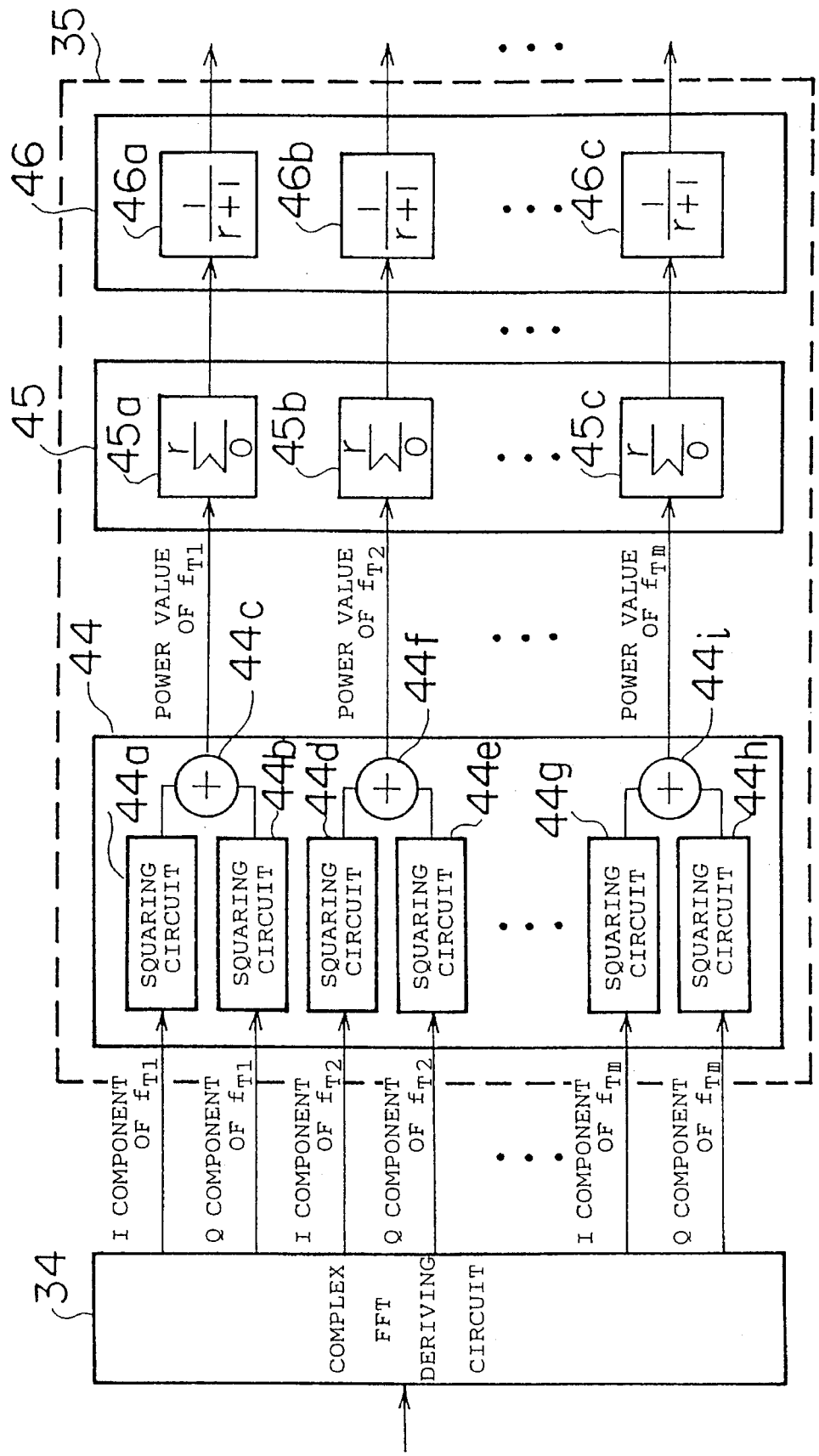
FIG. 8 is a block diagram illustrating the arrangement of a propagation characteristic analyzing circuit for deriving a narrow-band power fluctuation.

FIG. 8 is a block diagram showing the arrangement of a propagation characteristic analyzing circuit for deriving a narrow-band power fluctuation. This propagation characteristic analyzing circuit 35 comprises a power calculating circuit 44, an accumulating circuit 45, and a dividing circuit 46, each associated with the individual received signals. The frame synchronizing signal and the burst synchronizing signal are supplied from the frame/burst synchronizing signal generator 36 to the complex FFT deriving circuit 34 and the propagation characteristic analyzing circuit 35, as mentioned above, and these signals are supplied to each of the power calculating circuit 44, accumulating circuit 45 and dividing circuit 46 of the analyzing circuit 35, though not illustrated in FIG. 8.

As elements associated with the received signal with frequency $f_{T1}$, the power calculating circuit 44 includes a squaring circuit 44a for squaring the I component of the received signal, a squaring circuit 44b for squaring the Q component of the same signal, and an adder circuit 44c for adding together the outputs of the squaring circuits 44a and 44b. Similarly, squaring circuits 44d, 44g for the I component, squaring circuits 44e, 44h for the Q component, and adder circuits 44f, 44i for adding up the outputs of the corresponding two squaring circuits are provided for the received signals with frequencies $f_{T2}$ to $f_{Tm}$. With this arrangement, power values of the individual received signals with frequencies $f_{T1}$ to $f_{Tm}$ are output from the power calculating circuit 44.

The accumulating circuit 45 comprises accumulators 45a–45c associated with the respective received signals with frequencies $f_{T1}$ to $f_{Tm}$, and the dividing circuit 46 comprises dividers 46a–46c also associated with the respective received signals with frequencies $f_{T1}$ to $f_{Tm}$. Each of the accumulators 45a–45c accumulates the power values of the corresponding received signal measured a given number of times, (r+1), from the zeroth to the rth measurement. The dividers 46a–46c each divides the corresponding accumulated value by (r+1), and outputs the result, i.e., an average value of short-interval fluctuation.

Namely, the propagation characteristic analyzing circuit 35 outputs an average value $G_L$ of narrow-band power fluctuations of each of the received signals with frequency band $f_{T1}$ to $f_{Tm}$ within a short interval (movement of about several tens of meters of each mobile station), as indicated by the following equation (1):

$$G_L = \frac{\sum_{i=0}^{r} g_i}{r+1} \tag{1}$$

where $g_i$ represents the narrow-band (e.g., 10 kHz-band) power sampled by the ith measurement, and (r+1) represents the number of measurements.

Figure 9:
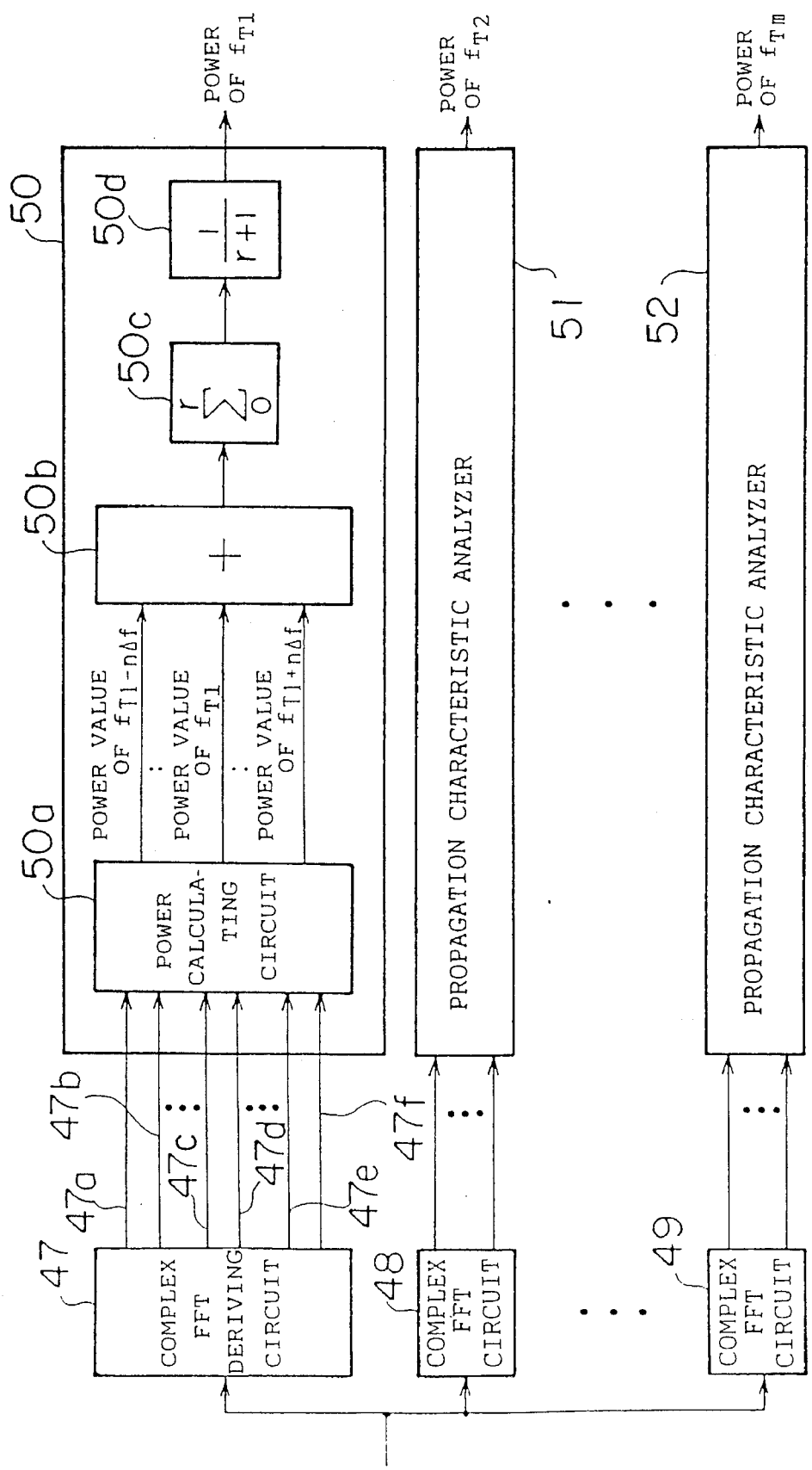
FIG. 9 is a block diagram illustrating the arrangement of a propagation characteristic analyzing circuit for deriving a broad-band power fluctuation.

FIG. 9 is a block diagram showing the arrangement of a propagation characteristic analyzing circuit for deriving a broad-band power fluctuation. Specifically, the complex FFT deriving circuit 34 in FIG. 3 is composed of a complex FFT circuit deriving 47 for deriving the complex Fourier transforms of signals with frequency band $f_{T1} \pm n\Delta f$ in the input IF signals, a complex FFT circuit 48 for deriving the complex Fourier transforms of signals with frequency band $f_{T2} \pm n\Delta f, \ldots$, and a complex FFT circuit 49 for deriving the complex Fourier transforms of signals with frequency band $f_{Tm} \pm n\Delta f$. The propagation characteristic analyzing circuit 35 in FIG. 3 comprises a propagation characteristic analyzer 50 associated with the complex FFT deriving circuit 47, a propagation characteristic analyzer 51 associated with the complex FFT circuit 48, $\ldots$, and a propagation characteristic analyzer 52 associated with the complex FFT circuit 49.

The complex FFT deriving circuit 47 outputs the I component of the signal with frequency $f_{T1} - n\Delta f$ at a signal line 47a, the Q component of the signal with frequency $f_{T1}-n\Delta f$ at a signal line 47b, the I component of the signal with frequency $[f_{T1}-(n-1)\Delta f]$ at a signal line 47c, the Q component of the signal with frequency $[f_{T1}-(n-1)\Delta f]$ at a signal line 47d, the I component of the signal with frequency $f_{T1}+n\Delta f$ at a signal line 47e, and the Q component of the signal with frequency $f_{T1}+n\Delta f$ at a signal line 47f. Likewise, the complex FFT deriving circuit 48 outputs the I and Q components of the signals with frequencies $f_{T2}-n\Delta f$, $f_{T2}-(n-1)\Delta f$, ... $f_{T2}$, ... $f_{T2}+(n-1)\Delta f$ and $f_{T2}+n\Delta f$, and the complex FFT circuit 49 outputs the I and Q components of the signals with frequencies $f_{Tm}-n\Delta f$, $f_{Tm}-(n-1)\Delta f$, ... $f_{Tm}$, ... $f_{Tm}+(n-1)\Delta f$ and $f_{Tm}+n\Delta f$.

The propagation characteristic analyzer 50 comprises a power calculating circuit 50a, an adder circuit 50b, an accumulating circuit 50c, and a dividing circuit 50d. The power calculating circuit 50a has the same arrangement as the power calculating circuit 44 shown in FIG. 8, and outputs power values of the received signals with frequencies $f_{T1}-n\Delta f$, $f_{T1}-(n-1)\Delta f$, ... $f_{T1}$, ... $f_{T1}+(n-1)\Delta f$ and $f_{T1}+n\Delta f$. The adder circuit 50b adds together the power values, and the accumulating circuit 50c accumulates (r+1) sums obtained in this manner from the zeroth to the rth measurement. The dividing circuit 50d divides the accumulated value by (r+1), and outputs the result, i.e., an average value of short-interval fluctuations of the received signal with frequency $f_{T1}$.

Although not illustrated in FIG. 9, the frame synchronizing signal and the burst synchronizing signal are supplied from the frame/burst synchronizing signal generator 36 (FIG. 3) to the complex FFT circuit 47 and the propagation characteristic analyzer 50, and these signals are supplied to each of the power calculating circuit 50a, adder circuit 50b, accumulating circuit 50c and dividing circuit 50d of the propagation characteristic analyzer 50.

The propagation characteristic analyzers 51–52 are constructed in the same manner as the above-described analyzer 50, and output average values of short-interval fluctuations of the respective signals with frequencies $f_{T2}$ to $f_{Tm}$.

Namely, the propagation characteristic analyzers 50–52 each output an average value $W_L$ of broad-band power fluctuations of the corresponding received signal (frequencies: $f_{T1}$ to $f_{Tm}$) within a short interval (movement of about several tens of meters of the mobile station), as indicated by the following equation (2):

$$W_L = \frac{\sum_{i=0}^{r} w_i}{r+1} \quad (2)$$

where $w_i$ represents the broad-band (e.g., 10 MHz-band) power sampled by the ith measurement, and r represents the number of measurements.

Figure 10:
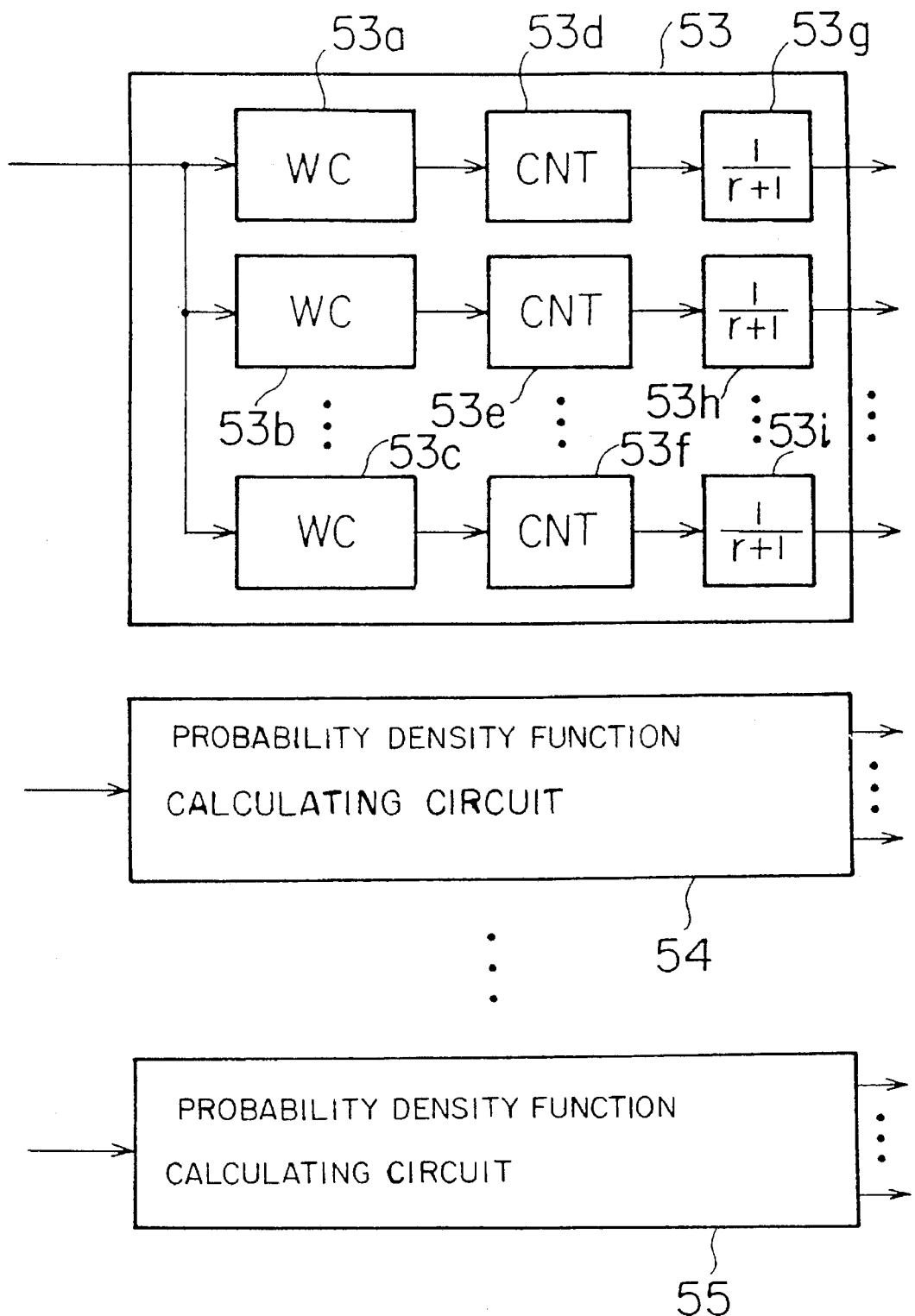
FIG. 10 is a block diagram illustrating the arrangement of a propagation characteristic analyzing circuit for deriving a probability density function of an instantaneous value of power fluctuation.

FIG. 10 is a block diagram showing the arrangement of a propagation characteristic analyzing circuit for obtaining the probability density function of an instantaneous value of power fluctuation. Specifically, probability density function calculating circuits 53–55 are provided respectively for the received signals with frequencies $f_{T1}$ to $f_{Tm}$, in addition to the propagation characteristic analyzing circuit shown in FIG. 8 or 9. The probability density function calculating circuit 53 comprises window comparators 53a–53c, counters 53d–53f, and dividing circuits 53g–53i.

The window comparator 53a determines whether the average value of power fluctuation with frequency $f_{T1}$ falls within a power range of $P_0\pm\Delta P$, and the counter 53d determines how many times the average value falls within the power range $P_0\pm\Delta P$ during (r+1) measurements from the zeroth to the rth measurement, and outputs the count value.

The dividing circuit 53g divides the output value of the counter 53d by (r+1). Thus, the output value of the dividing circuit 53g represents the probability that the average value of power fluctuation with frequency $f_{T1}$ becomes equivalent to the power value $P_0$.

The window comparator 53b determines whether the average value of power fluctuation with frequency $f_{T1}$ falls within a power range of $P_1\pm\Delta P$, and the counter 53e determines how many times the average value falls within the power range $P_1\pm\Delta P$ during (r+1) measurements from the zeroth to the rth measurement, and outputs the count value. The dividing circuit 53h divides the output value of the counter 53e by (r+1). Thus, the output value of the dividing circuit 53h represents the probability that the average value of power fluctuation with frequency $f_{T1}$ becomes equivalent to the power value $P_1$.

Similarly, the window comparator 53c determines whether the average value of power fluctuation with frequency $f_{T1}$ falls within a power range of $P_L\pm\Delta P$, and the counter 53f determines how many times the average value falls within the power range $P_L\pm\Delta P$ during (r+1) measurements from the zeroth to the rth measurement, and outputs the count value. The dividing circuit 53i divides the output value of the counter 53f by (r+1). Thus, the output value of the dividing circuit 53i represents the probability that the average value of power fluctuation with frequency $f_{T1}$ becomes equivalent to the power value $P_L$.

The probability density function calculating circuits 54–55 are constructed in the same manner as the above-described calculating circuit 53, and output values representing the probabilities that the corresponding average values of power fluctuation with frequencies $f_{T2}$ to $f_{Tm}$ become equivalent to respective predetermined power values.

Thus, by using the probability density function calculating circuits 53–55 in combination with the propagation characteristic analyzing circuit (FIG. 8) for obtaining narrow-band power fluctuation, it is possible to obtain a probability density function $P_g(x)$ of an instantaneous value of narrow-band power fluctuation, as indicated by the following equation (3):

$$P_g(x) = \frac{\sum_{i=0}^{r} \left( \Pi x = \frac{g_i}{G_L} \right)}{r+1} \quad (3)$$

In the case where the probability density function calculating circuits 53–55 are used with the propagation characteristic analyzing circuit (FIG. 9) for obtaining broad-band power fluctuation, a probability density function $P_w(x)$ of an instantaneous value of broadband power fluctuation can be obtained as indicated by the following equation (4):

$$P_w(x) = \frac{\sum_{i=0}^{r} \left( \Pi x = \frac{w_i}{W_L} \right)}{r+1} \quad (4)$$

A method of obtaining broad-band transmission characteristics by using the propagation characteristic analyzing circuit 35 in FIG. 3 will be now explained.

Namely, an ordinary arithmetic unit is added to the propagation characteristic analyzing circuit 35, and an amplitude/frequency characteristic is calculated according to the following equation (5):

Amplitude/frequency characteristic $= a_o + a_i f_i + a_2 f_i^2 + \ldots + a_n f_i^n$ where $f_i$ represents the frequency deviation from the center frequency, and it is assumed that actual measured values of the amplitude/frequency characteristic are x(0), x(1), ... and x(n) [x(q) denotes the actual measured amplitude of the qth frequency]. Further, $a_i$ in equation (5) is given by the following equation (6), and $|D|$ and $|D_j|$ in equation (6) are given by equations (7) and (8), respectively:

$$a_i = \frac{|D_j|}{|D|} \tag{6}$$

$$|D| = \begin{vmatrix} \sum_{i=0}^{n} 1, & \sum_{i=0}^{n} f_i, & \sum_{i=0}^{n} f_i^2, & \ldots & \sum_{i=0}^{n} f_i^n \\ \sum_{i=0}^{n} f_i & & \ldots & \ldots & \sum_{i=0}^{n} f_i^{(n+1)} \\ \sum_{i=0}^{n} f_i^2 & & & & \vdots \\ \vdots & & & & \vdots \\ \sum_{i=0}^{n} f_i^n, & \sum_{i=0}^{n} f_i^{(n+1)}, & & \ldots & \sum_{i=0}^{n} f_i^{2n} \end{vmatrix} \tag{7}$$

$$|D_j| = \begin{vmatrix} \sum_{i=0}^{n} x(0) & \ldots & \sum_{i=0}^{n} x(m)f_i^S & \ldots & \sum_{i=0}^{n} x(n)f_i^n \\ \vdots & \ldots & \sum_{i=0}^{n} x(m)f_i^{(S+1)} & \ldots & \vdots \\ \vdots & & & & \vdots \\ \sum_{i=0}^{n} x(o)f_i^n & \ldots & \ldots & \ldots & \sum_{i=0}^{n} x(n)f_i^{2n} \end{vmatrix} \tag{8}$$

Subsequently, the method of detecting notches by the propagation characteristic analyzing circuit 35 shown in FIG. 3 will be explained.

Figure 11:
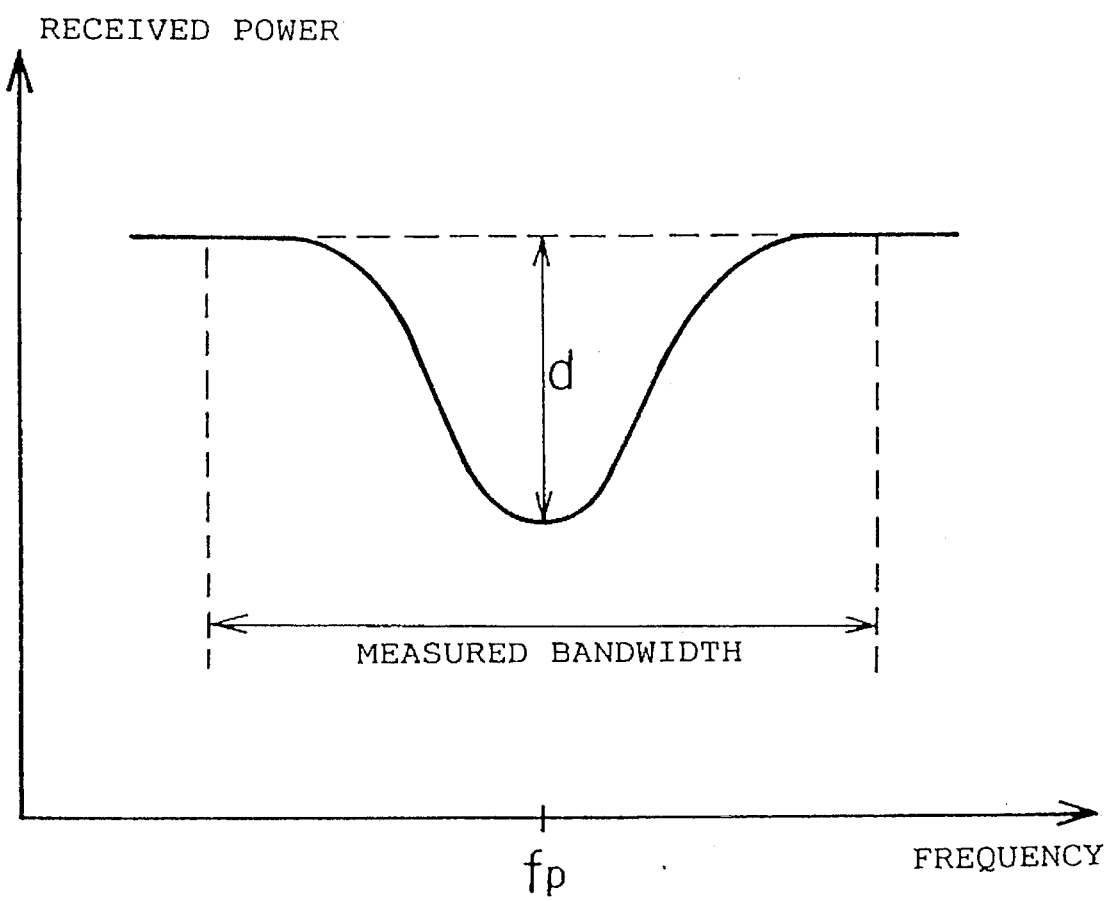
FIG. 11 is a diagram illustrating a notch.

There sometimes occurs a depression of electric power, i.e., a notch, within the power spectrum measurement band, as shown in FIG. 11, and the rate of occurrence of such notches is obtained. First, the number of notches occurred and their depths d (power values) are measured in respect of each analysis (each frame) of the complex Fourier transforms, and the rate of occurrence of notches, P(d), is calculated according to the following equation (9):

$$P(d) = \frac{\sum_i n_i(d)}{\sum_i N_i} \tag{9}$$

where $N_i$ represents the number of notches occurred during the ith sampling, and $n_i(d)$ represents the number of notches with the depth d occurred during the ith sampling.

Referring again to FIG. 3, the propagation characteristic analyzing circuit 35 always determines whether the mobile stations are transmitting signals, and analyzes the propagation characteristics only when the mobile stations are transmitting signals.

The propagation characteristic analyzing circuit 35 may be designed to accumulate and smooth a plurality of frequency spectra associated with each frame of the received signals, to thereby cope with discontinuity of frequency spectrum attributable to noise or biased coding.

Further, the propagation characteristic analyzing circuit 35 may be designed to carry out a phase correction on the output data from the complex FFT deriving circuit 34 for each measurement (each frame). Namely, phase rotation is compensated for by adding up corresponding bursts in each frame period. In this case, the C/N ratio is improved, making it possible to measure a received signal even if the signal contains high-magnitude noise.

The waves transmitted from a plurality of mobile stations having the arrangement shown in FIG. 7 need not be modulated in accordance with the same modulation mode. The propagation characteristic analyzing circuit 35 operates properly even if the transmitted waves have been modulated according to different modulation modes, and accordingly, comparison of propagation characteristics is available in a communication system using different modulation modes.

Further, a signal as a reference signal may be previously received by at least one of the mobile stations, so that the propagation characteristic analyzing circuit 35 retains the result of analysis of the reference signal and the result of analysis of a later received signal is compensated for based on the result of analysis of the reference signal, to thereby enhance the accuracy of measurement of propagation characteristics.

Furthermore, at least one of the mobile stations may be designed to experimentally transmit a non-modulated signal, the reception level of which is then measured by the propagation characteristic analyzing circuit 35. Use of the non-modulated signal makes it possible to measure the reception level with increased C/N ratio.

Moreover, at least one of the mobile stations may be designed to experimentally transmit a plurality of non-modulated burst signals to enhance the C/N ratio at the receiving side. In this case, the propagation characteristic analyzing circuit 35 estimates the propagation characteristics within the transmission band, on the basis of the propagation characteristics of the individual non-modulated carriers and by means of interpolating and extrapolating means associated with the respective non-modulated carriers.

Namely, the amplitude/frequency characteristic G(f) is calculated according to the following equation (10) which is a Lagrange's equation:

$$G(f) = L_0(f)X_o + L_i(f)X_i + \ldots + L_n(f)X_n \tag{10}$$

where $L_i(f)$ is given by equation (11) below. In equation (11), $f_i$ represents a frequency within the transmission band, and $x_i$ in equation (10) represents the amplitude value at the frequency point $f_i$.

$$L_i(f) = \frac{(f-f_0)\ldots(f-f_{i-1})(f-f_{i+1})\ldots(f-f_n)}{(f_i-f_0)\ldots(f_i-f_{i-1})(f_i-f_{i+1})\ldots(f_i-f_n)} \tag{11}$$

Further, at least one of the mobile stations may be designed to transmit signals modulated in a multicarrier mode, so that the propagation characteristic analyzing circuit 35 estimates the propagation characteristics of the transmission band, on the basis of the propagation characteristics of the individual non-modulated carriers and by means of interpolating and extrapolating means associated with the respective non-modulated carriers.

On the receiving side, moreover, non-receive burst intervals may be provided corresponding to the received waves of different frequencies, a power value (interference wave power value) of the individual intervals is measured, and a D/U (signal-to-interfering power) ratio and a C/N ratio are calculated from the measured value and the received power. In this case, the D/U and C/N ratios and the propagation characteristics can be obtained at the same time.

Furthermore, the D/U and C/N ratios and propagation characteristics of null burst may be previously estimated for each of the frequencies and bursts; so that when the transmission quality of the received signal lowers to a prescribed level, an optimum null burst may be used.

In the case where the mobile stations each comprise a multimode terminal having a plurality of communication modes, an optimum communication mode can be selected by estimating the transmission quality of null burst communication mode, followed by the selection of an optimum burst.

A second embodiment of the present invention will be now described.

Figure 12:
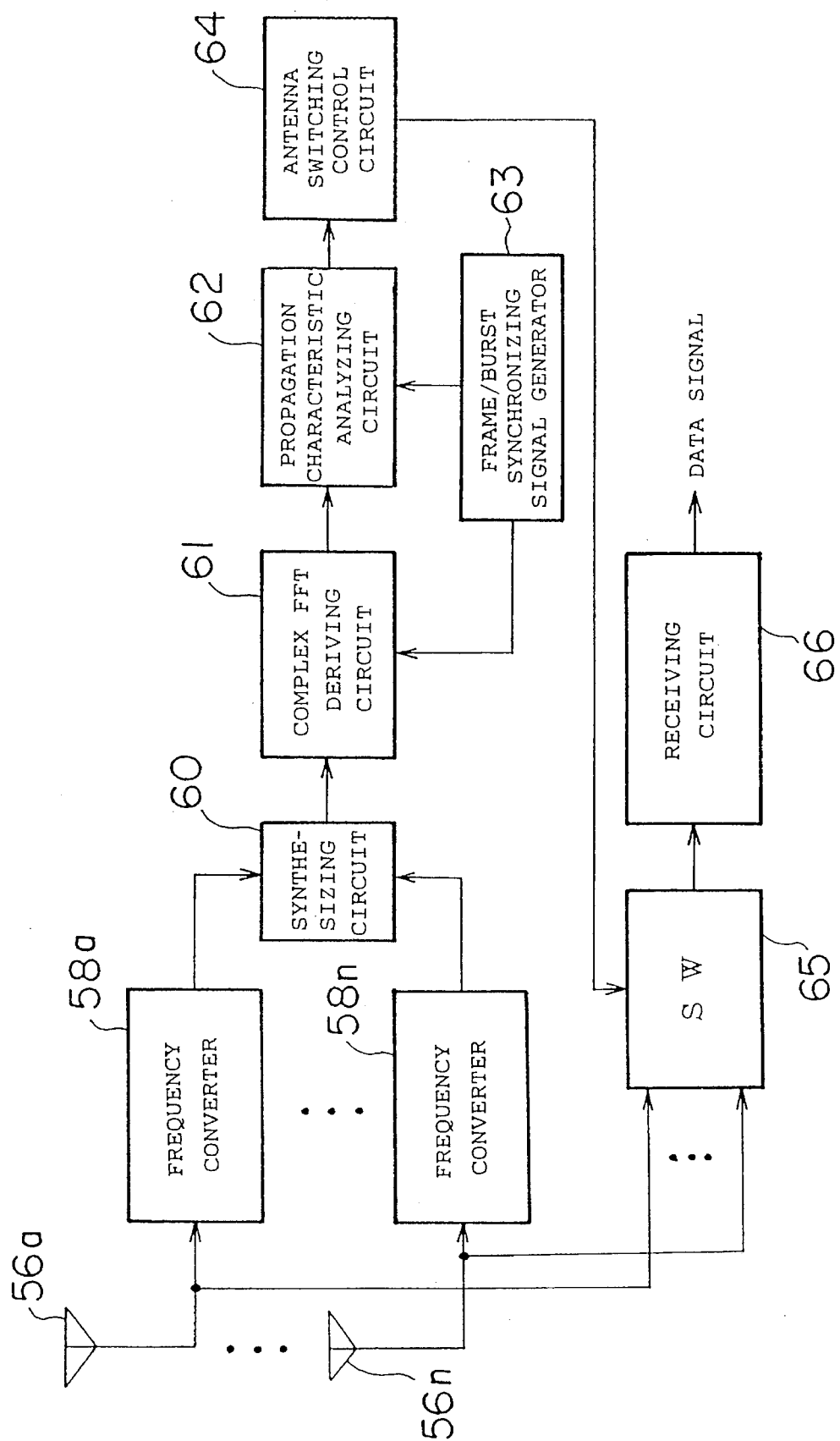
FIG. 12 is a block diagram of a radio receiver according to a second embodiment.

FIG. 12 is a block diagram of a radio receiver according to the second embodiment. The radio receiver is installed in a base station which is equipped with a plurality of antennas for collectively receiving waves transmitted from a plurality of mobile stations (not shown) each having a slightly different transmission frequency.

Specifically, receiving antennas 56a–56n collectively receive radio waves of frequencies $f_{T1}$ to $f_{Tm}$ transmitted from a plurality of mobile stations. Each of frequency converters 58a–58n connected to the respective antennas have the same arrangement as the frequency converter 32 shown in FIG. 3; however, the local oscillators built in the respective converters generate local oscillation signals of different frequencies, for example, frequencies $f_{R1}$ to $f_{Rm}$. Accordingly, the frequency converters 58a–58n output IF-band signals whose frequencies are set apart from one another by corresponding ones of frequency differences ($f_{T1}$ to $f_{Tm}$) of the signals transmitted from the mobile stations, as well as by the frequency differences ($f_{R1}$ to $f_{Rm}$) of the local oscillators.

Figure 13A:
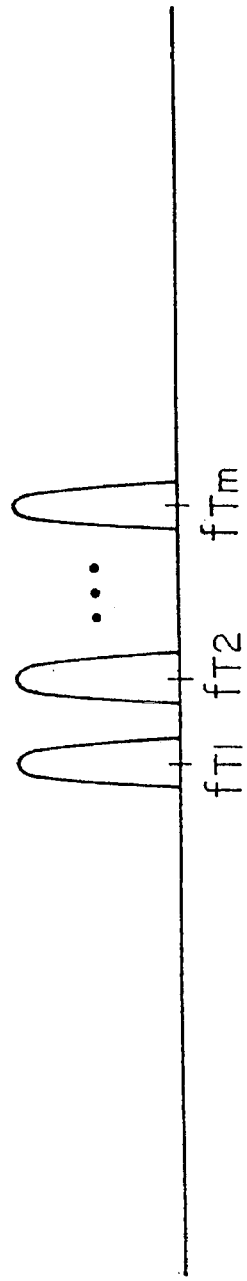
FIG. 13(A) is a diagram of frequency spectrum before frequency conversion is carried out.
Figure 13B:
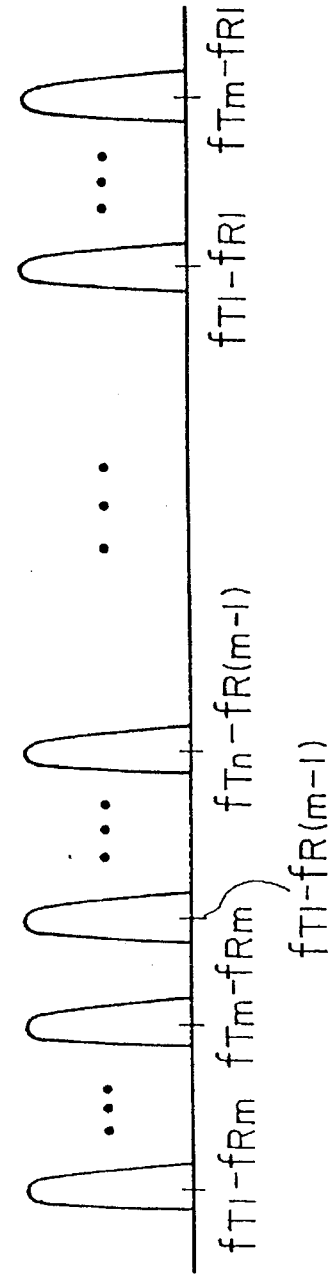
FIG. 13 (B) is a diagram of frequency spectrum after frequency conversion is carried out.

The frequency spectra of FIG. 13 illustrate such a frequency conversion. Specifically, signals (transmission frequencies $f_{T1}$, $f_{T2}$, ... $f_{Tm}$) transmitted from a plurality of mobile stations, shown in FIG. 13(A), are input to the frequency converters 58a–58n, which each then collectively change the input frequencies by an amount equal to the local oscillation frequency ($f_{R1}$, ... $f_{Rm}$) of the local oscillator incorporated therein. The frequency converters 58a–58n output IF signals having frequencies $f_{T1}-f_{Rm}$, $f_{T2}-f_{Rm}$, ... $f_{Tm}-f_{Rm}$, IF signals having frequency bands $f_{T1}-f_{R(m-1)}$, $f_{T2}-f_{R(m-1)}$, ... $f_{Tm}-f_{R(m-1)}$, ... and IF signals having frequency bands $f_{T1}-f_{R1}$, $f_{T2}-f_{R1}$, ... $f_{Tm}-f_{R1}$, respectively.

Referring again to FIG. 12, the IF signals are synthesized by a synthesizing circuit 60, and the synthesized signals are supplied to a propagation characteristic analyzing circuit 62 via a complex FFT deriving circuit 61. The complex FFT deriving circuit 61 and the propagation characteristic analyzing circuit 62 are each supplied with a frame synchronizing signal and a burst synchronizing signal from a frame/burst synchronizing signal generator 63. The complex FFT deriving circuit 61, the propagation characteristic analyzing circuit 62, and the frame/burst synchronizing signal generator 63 are constructed in the same manner as their respective counterparts (34, 35, 36) shown in FIG. 3.

The propagation characteristic analyzing circuit 62 has an output terminal connected to an antenna switching control circuit 64. Based on the results of the analyses supplied from the propagation characteristic analyzing circuit 62, the antenna switching control circuit 64 compares the propagation characteristics of those received waves which are transmitted from an identical mobile station and received by different antennas, and outputs a select signal specifying a particular antenna through which a wave with excellent propagation characteristics has been received, to a switch (SW) 65.

In accordance with the select signal from the antenna switching control circuit 64, the switch 65 permits the received wave with excellent propagation characteristics to pass from the particular antenna to a receiving circuit 66. The receiving circuit 66 has an arrangement similar to that of the receiving circuit 33 shown in FIG. 3, but it does not include a circuit for separating a plurality of received signals from each other.

In FIG. 12, the transmission system is omitted.

With the arrangement described above, each of the frequency converters 58a–58n collectively receives signals from a plurality of mobile stations via the corresponding antenna, and converts the received signals to IF-band signals, respectively. The IF-band signals are synthesized by the synthesizing circuit 60, whereupon the complex FFT deriving circuit 61 collectively derives the complex Fourier transforms of the synthesized signals, the resulting frequency spectra being supplied to the propagation characteristic analyzing circuit 62. Based on the frequency spectra, the propagation characteristic analyzing circuit 62 simultaneously analyzes the propagation characteristic of the individual received waves.

Based on the results of the analyses, the antenna switching control circuit 64 compares the propagation characteristics of those waves which are transmitted from an identical mobile station and received by different antennas, and the switch 65 allows a received wave with excellent propagation characteristics to pass from the corresponding antenna to the receiving circuit 66. Thus, it is possible to instantaneously receive waves with excellent propagation characteristics at all times.

In the second embodiment in FIG. 12, a plurality of receiving circuits may be disposed in the front of the switch 65 in correspondence with the receiving antennas 56a–56n. The switch 65 selects a demodulated signal with excellent propagation characteristics among the corresponding receiving circuit, and outputs it as a data signal.

In the above radio receiver, the antennas 56–57 may be disposed in multi-plane arrangement for space diversity reception, or be arranged three-dimensionally for three-dimensional space diversity reception. Also, a plurality of directional antennas may be arranged in a two-dimensional or three-dimensional radial form for solid-angle diversity reception.

Also in the second embodiment, the propagation characteristic analyzing circuit 62 may be designed to accumulate and smooth a plurality of frequency spectra associated with each frame of the received signals, like the first embodiment.

Further, the propagation characteristic analyzing circuit 62 may be designed to carry out a phase correction on the output data from the complex FFT deriving circuit 61 for each measurement (each frame).

Even in the case where waves transmitted from a plurality of mobile stations are modulated in different modulation modes, the propagation characteristic analyzing circuit 62 operates properly, and accordingly, comparison of propagation characteristics is available in a communication system using different modulation modes.

Further, a signal as a reference signal may be previously received by at least one of the mobile stations, so that the propagation characteristic analyzing circuit 62 retains the result of analysis of the reference signal and the result of analysis of a later received signal is compensated for based on the result of analysis of the reference signal, to thereby enhance the measurement accuracy of propagation characteristics.

Furthermore, at least one of the mobile stations may be designed to experimentally transmit a non-modulated signal, the reception level of which is then measured by the propagation characteristic analyzing circuit 62.

Moreover, at least one of the mobile stations may be designed to experimentally transmit a plurality of non-modulated burst signals to enhance the C/N ratio at the receiving side. In this case, the propagation characteristic analyzing circuit 62 estimates the propagation characteristics of the transmission band, on the basis of the propagation characteristics of the individual non-modulated carriers and by means of interpolating and extrapolating means associated with the respective non-modulated carriers.

Further, at least one of the mobile stations may be designed to transmit signals modulated in a multicarrier mode, so that the propagation characteristic analyzing circuit 62 estimates the propagation characteristics of the transmission band, on the basis of the propagation characteristics of the individual non-modulated carriers and by means of interpolating and extrapolating means associated with the respective non-modulated carriers.

On the receiving side, moreover, non-receive burst intervals may be provided corresponding to the received waves of different frequencies, a power value (interference wave power value) of the individual intervals is measured, and a D/U (signal-to-interfering power) ratio and a C/N ratio are calculated from the measured value and the received power.

Furthermore, the D/U and C/N ratios and propagation characteristics of null burst may be previously estimated for each of the frequencies and bursts, so that when the transmission quality of the received signal lowers to a prescribed level, an optimum null burst may be used.

In the case where the mobile stations each comprise a multimode terminal having a plurality of communication modes, an optimum communication mode can be selected by estimating the transmission quality of null burst communication mode, followed by the selection of an optimum burst.

A third embodiment according to the present invention will be now described.

Figure 14:
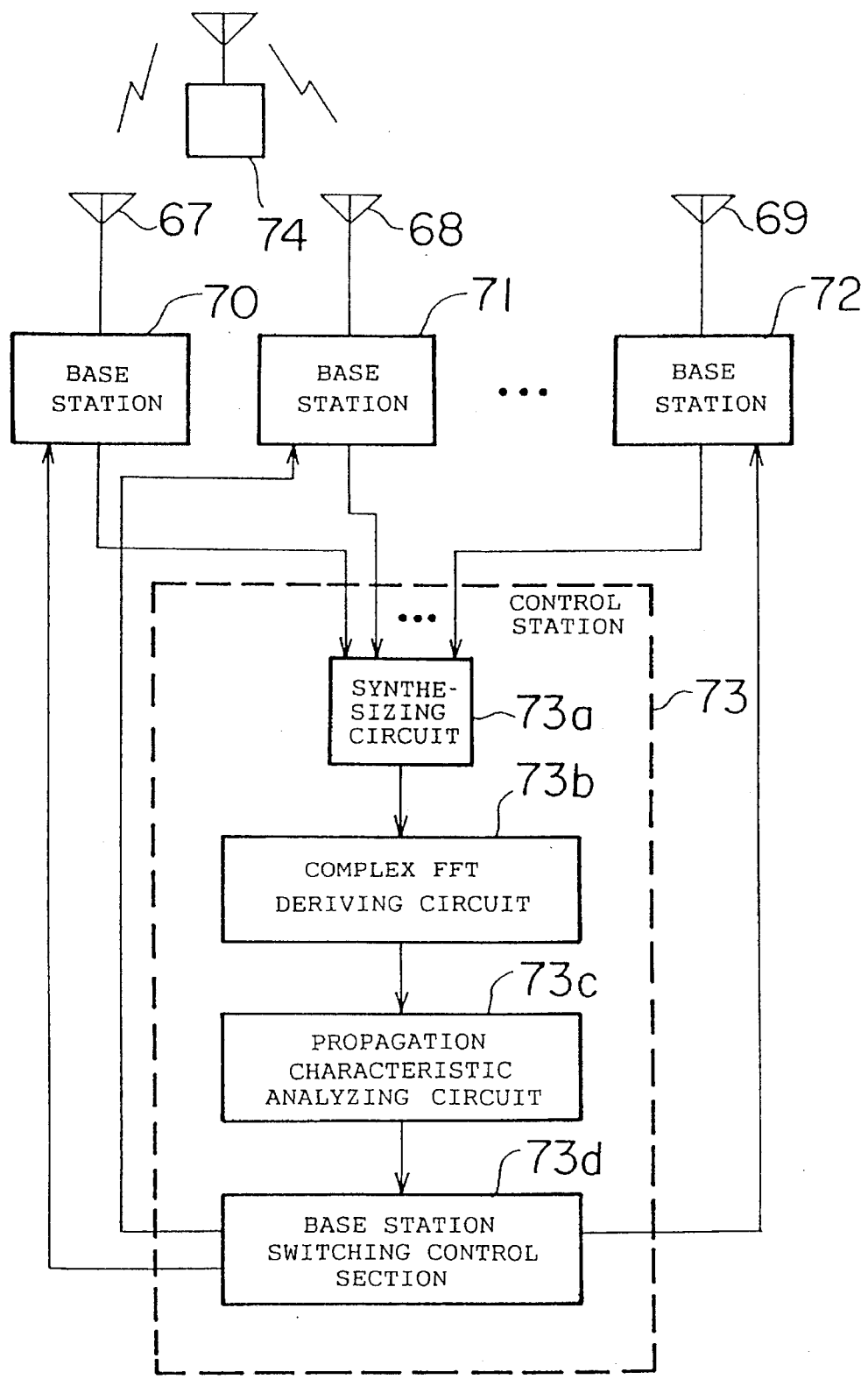
FIG. 14 is a block diagram of a radio receiver according to a third embodiment.

FIG. 14 is a block diagram of a radio receiver according to the third embodiment. Specifically, a plurality of antennas 67–69 are arranged corresponding to respective base station zones and are connected to base stations 70–72, respectively. The base stations 70–72 are provided with frequency converters equivalent to those (58–59) shown in FIG. 12, and are connected to a control station 73. The control station 73 includes a synthesizing circuit 73a, a complex FFT deriving circuit 73b, a propagation characteristic analyzing circuit 73c, and a base station switching control section 73d. The synthesizing circuit 73a, the complex FFT deriving circuit 73b, and the propagation characteristic analyzing circuit 73c are constructed in the same manner as their respective counterparts (60, 61, 62) shown in FIG. 12.

Based on the results of the analyses supplied from the propagation characteristic analyzing circuit 73c, the base station switching control section 73d compares the propagation characteristics of those waves which are supplied from an identical mobile station, for example, a mobile station 74 located near the boundary between the zones of the base stations 70–72 and which are received by different antennas 67–69, and supplies a select signal to that base station which is receiving a wave with excellent propagation characteristics, and a non-select signal to other base stations. The base station supplied with the select signal receives the signal transmitted from the mobile station 74, while the other base stations supplied with the non-select signal do not receive the signal from the mobile station 74 (station diversity reception).

Each of the antennas 67–69 may be composed of a plurality of antennas such that each base station is equipped with a plurality of antennas, thereby to carry out space diversity reception in addition to station diversity reception.

In the third embodiment, a plurality of complex FFT deriving circuits may be disposed in the front of the propagation characteristic analysing circuit 73c in correspondence with the base stations 70–72 without disposing the synthesizing circuit 73a.

As described above, the present invention comprises the frequency converter for collectively converting signals, transmitted from a plurality of mobile stations, to respective IF-band signals, the complex Fourier transform deriving means for collectively deriving the complex Fourier transforms of the IF-band signals, and the analyzing means for simultaneously analyzing the propagation characteristics of the individual received waves. Thus, it is possible to instantaneously measure the propagation characteristics of channels at all times while the channels are in use.

The present invention may also comprise a plurality of frequency converters associated with a plurality of antennas, respectively, and selecting means for comparing the propagation characteristics of those received waves which are transmitted from an identical mobile station and received by different antennas, on the basis of the results of the analyses by the analyzing means, and for permitting a received wave with excellent propagation characteristics to pass from the corresponding antenna to the receiving circuit. In this case, mobile communications with high transmission quality can be achieved even in the case where the propagation state is unstable.

Further, since the complex Fourier transform deriving means is capable of high-speed processing, propagation characteristics can be measured even when the mobile stations are moving at high speed, thus permitting superior diversity reception. Furthermore, a large number of received signals are collectively processed, and thus supervision switching can be achieved with a simple arrangement.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A radio receiver for a base station which receives signals transmitted from a plurality of mobile stations, comprising:

a frequency converter for collectively receiving signals transmitted from the mobile stations and converting the signals to IF-band signals, respectively;

complex Fourier transform deriving means for collectively deriving complex Fourier transforms of the converted IF-band signals;

analyzing means for simultaneously analyzing propagation characteristics of individual received waves, based on output data from said complex Fourier transform deriving means, and outputting results of the analysis; and burst synchronizing signal generating means for generating a burst synchronizing signal associated with each of the received waves, and supplying the burst synchronizing signal to said complex Fourier transform deriving means and said analyzing means.

2. The radio receiver according to claim 1, wherein said analyzing means accumulates and smoothes a plurality of frequency spectra for each frame of the received signals.

3. The radio receiver according to claim 1, wherein said analyzing means carries out phase correction on the output data from said complex Fourier transform deriving means.

4. A radio communication system having a base station, comprising:

a plurality of mobile stations for respectively transmitting signals;

a frequency converter arranged at the base station, for collectively receiving signals transmitted from said plurality of mobile stations and converting the signals to IF-band signals, respectively;

complex Fourier transform deriving means arranged at the base station, for collectively deriving complex Fourier transforms of the converted IF-band signals;

analyzing means arranged at the base station, for simultaneously analyzing propagation characteristics of individual received waves, based on output data from said complex Fourier transform deriving means, and outputting results of the analysis; and burst synchronizing signal generating means for generating a burst synchronizing signal associated with each of the received waves, and Supplying the burst synchronizing signal to said complex Fourier transform deriving means and said analyzing means.

5. The radio communication system according to claim 4, wherein the signals transmitted from said plurality of mobile stations are modulated according to different modulation modes.

6. The radio communication system according to claim 4, wherein at least one of said mobile stations previously receives a reference signal, said analyzing means referring to results of analysis of the reference signal to thereby enhance accuracy of analysis of a later received signal.

7. The radio communication system according to claim 4, wherein at least one of said mobile stations transmits a non-modulated signal, said analyzing means measuring a reception level of the non-modulated signal.

8. A radio communication system having a base station, comprising:

a plurality of mobile stations for respectively transmitting signals;

a frequency converter arranged at the base station, for collectively receiving signals transmitted from said plurality of mobile stations and converting the signals to IF-band signals respectively;

complex Fourier transform deriving means arranged at the base station for collectively deriving complex Fourier transforms of the converted IF-band signals; and analyzing means arranged at the base station, for simultaneously analyzing propagation characteristics of individual received waves, based on output data from said complex Fourier transform deriving means, and outputting results of the analysis;

wherein at least one of said mobile stations transmits a plurality of non-modulated burst signals, said analyzing means including interpolating means and extrapolating means receiving respective individual non-modulated carriers, for estimating propagation characteristics of a transmission band of said non, modulated burst signals, based on the propagation characteristics of individual non-modulated carriers.

9. A radio communication system having a base station, comprising:

a plurality of mobile stations for respectively transmitting signals;

a frequency converter arranged at the base station, for Collectively receiving signals transmitted from said plurality of mobile stations and converting the signals to IF-band signals, respectively;

complex Fourier transform deriving means arranged at the base station, for collectively deriving complex Fourier transforms of the Converted IF-band signals; and analyzing means arranged at the base station, for simultaneously analyzing propagation characteristics of individual received waves, based on output data from said complex Fourier transform deriving means, and outputting results of the analysis, wherein at least one of said mobile stations transmits signals modulated in a multicarrier mode, said analyzing means including interpolating means and extrapolating means receiving respective individual non-modulated carriers, for estimating propagation characteristics of individual non-modulated carriers.

10. A radio receiver for a base station which receives signals transmitted from a plurality of mobile stations, comprising:

a plurality of receiving antennas;

a plurality of frequency converters connected to said plurality of receiving antennas, respectively, for collectively receiving signals transmitted from the mobile stations, said frequency converters having local oscillators respectively built therein and having different oscillation frequencies for converting the received signals to IF-band signals, respectively;

synthesizing means for synthesizing the individual IF-band signals output from said plurality of frequency converters;

complex Fourier transform deriving means for collectively deriving complex Fourier transforms of the IF-band signals synthesized by said synthesizing means;

analyzing means for simultaneously analyzing propagation characteristics of individual received waves, based on output data from said complex Fourier transform deriving means; and burst synchronizing signal generating means for generating a burst synchronizing signal associated with each of the received waves, and supplying the burst synchronizing signal to said complex Fourier transform deriving Beans and said analyzing means.

11. The radio receiver according to claim 10, which further comprises selecting means for comparing the propagation characteristics of individual received waves which are transmitted from an identical mobile station and received by different receiving antennas, based on results of the analysis by said analyzing means, and for permitting a received wave with excellent propagation characteristics to pass from a corresponding receiving antenna to a receiving circuit.

12. The radio receiver according to claim 10, wherein said plurality of receiving antennas are disposed in multi-plane arrangement.

13. The radio receiver according to claim 10, wherein said plurality of receiving antennas are arranged three-dimensionally.

14. The radio receiver according to claim 10, wherein said plurality of receiving antennas comprise a plurality of directional antennas arranged in a two-dimensional or three-dimensional radial form.

15. The radio receiver according to claim 10, wherein said plurality of receiving antennas are arranged corresponding to a plurality of base station zones, respectively.

16. The radio receiver according to claim 15, wherein said plurality of receiving antennas each comprise a plurality of antennas associated with a corresponding one of the base station zones.

* * * * *